United States Patent [19]

Durand et al.

[11] Patent Number: 5,075,395
[45] Date of Patent: Dec. 24, 1991

[54] PROCESS FOR THE STARTING OF THE POLYMERIZATION OF ETHYLENE OR COPOLYMERIZATION OF ETHYLENE AND AT LEAST ONE OTHER ALPHA-OLEFIN IN THE GAS PHASE IN THE PRESENCE OF A CATALYST BASED ON CHROMIUM OXIDE

[75] Inventors: Daniel C. Durand, Battersea, England; Frederic R. M. M. Morterol, Saussset-les-Pins, France

[73] Assignee: BP Chemicals Limited, London, England

[21] Appl. No.: 157,169

[22] Filed: Feb. 11, 1988

Related U.S. Application Data

[63] Continuation of Ser. No. 47,537, May 4, 1987, abandoned, which is a continuation of Ser. No. 789,716, Oct. 21, 1985, abandoned.

[30] Foreign Application Priority Data

Oct. 24, 1984 [FR] France ................................ 84 16467

[51] Int. Cl.$^5$ .......................... C08F 2/34; C08F 10/02
[52] U.S. Cl. ..................... 526/105; 526/106; 526/348.6; 526/352; 526/901; 526/74; 526/904
[58] Field of Search ......................................... 526/105

[56] References Cited

U.S. PATENT DOCUMENTS

| | | | |
|---|---|---|---|
| 2,970,135 | 1/1961 | Lanning et al. | 526/904 |
| 3,158,594 | 11/1964 | Weil et al. | 526/105 |
| 3,922,322 | 11/1975 | Dormenval et al. | 526/901 |
| 4,035,560 | 7/1977 | Caumartin et al. | 526/901 |
| 4,295,991 | 10/1981 | Wristers | 252/429 B |
| 4,376,191 | 3/1983 | Geck | 526/102 |
| 4,467,080 | 8/1984 | Brun . | |
| 4,517,345 | 5/1985 | Eve et al. | 526/105 |
| 4,564,660 | 1/1986 | Williams et al. | 526/105 |
| 4,910,271 | 3/1990 | Bailly et al. . | |

FOREIGN PATENT DOCUMENTS

| | | |
|---|---|---|
| 4966 | 10/1979 | European Pat. Off. . |
| 130607 | 9/1985 | European Pat. Off. . |
| 2059217 | 5/1971 | France . |

*Primary Examiner*—Edward J. Smith
*Attorney, Agent, or Firm*—Brooks Haidt Haffner & Delahunty

[57] ABSTRACT

The present invention relates to a process for starting up the polymerization of ethylene or copolymerization of ethylene and at least one other alpha-olefin by bringing ethylene and optionally at least one other alpha-olefin in contact under fluidized-bed polymerization or copolymerization conditions and/or stirred mechanically, with a charge powder in the presence of a catalyst comprising a chromium oxide compound associated with a granular support and activated by thermal treatment, this catalyst being used in the form of a prepolymer, this process being characterized in that the charge powder employed is previously subjected to a treatment by contacting the said charge powder with an organo-aluminium compound, in such a way that the polymerization or copolymerization starts up immediately after the contacting of the ethylene and optionally one other alpha-olefin with the charge powder in the presence of the prepolymer.

12 Claims, No Drawings

PROCESS FOR THE STARTING OF THE POLYMERIZATION OF ETHYLENE OR COPOLYMERIZATION OF ETHYLENE AND AT LEAST ONE OTHER ALPHA-OLEFIN IN THE GAS PHASE IN THE PRESENCE OF A CATALYST BASED ON CHROMIUM OXIDE

This application is a continuation of application Ser. No. 07/047,537, filed May 4, 1987, which is a continuation of application Ser. No. 06/789,716, filed Oct. 21, 1985, both now abandoned.

The present invention relates to a process for starting up the polymerization of ethylene or copolymerization of ethylene and at least one other alpha-olefin in the gas phase, in the presence of a catalyst comprising a chromium oxide compound associated with a granular support based on a refractory oxide and activated by thermal treatment, for example a Phillips-type catalyst.

It is already known that ethylene can be polymerized alone or in admixture with other alpha-olefins in the presence of catalysts comprising a chromium oxide compound associated with a granular support based on a refractory oxide and activated by thermal treatment. These catalysts used in the polymerization of alpha-olefins and in particular ethylene, have been described in numerous patents, such as for example British patents nos. 790195 and 804641.

It is also known that such catalysts should preferably comprise at least one chromium compound with a valency equal to 6, in a quantity such that the said catalysts contain at least 0.05% by weight of chromium. However, it has been found that the polymerization of the alpha-olefins may also be achieved under good conditions by means of chromium compounds with different valencies, mostly less than 6, these compounds being obtained for example by the reduction of hexavalent chromium compounds before the commencement of polymerization and/or during the polymerization itself.

It is known that these catalysts may be prepared by depositing a chromium compound such as a chromium oxide, or a chromium compound which can be converted by calcining into chromium oxide, on a granular support based on a refractory oxide, then by activation by thermal treatment at a temperature of at least 250° C. and at most equal to the temperature at which the granular support begins to sinter, so that at the end of the thermal treatment the chromium compound is at least partially in the hexavalent state. Moreover, numerous methods exist to modify these catalysts, especially by incorporating in them compounds of titanium, fluorine or organo-metallic compounds.

It is also known that ethylene or a mixture of ethylene and at least one other alpha-olefin can be polymerized in the gas phase by bringing them into contact with the catalyst in an apparatus in which the polymer or the copolymer is maintained in a fluidized bed and/or is agitated with mechanical stirring. In the special case of use of a fluidized bed reactor, the solid polymer in course of formation is maintained in the fluidized state by means of a rising reaction gas mixture, comprising the ethylene to be polymerized and optionally at least one other alpha-olefin to be copolymerized. The gaseous mixture leaving the reactor is generally cooled before being recycled into the reactor and having an addition of ethylene and optionally at least one other alpha-olefin added to it, corresponding to the quantities consumed. The start-up of the polymerization reaction in the gas phase is generally performed by introducing catalyst into a reactor fed with reaction gas mixture and containing a charge powder. This charge powder consisting of solid particles, such as particles of polyethylene or ethylene copolymer, is used to form the initial bed at the moment of start-up of the polymerization reaction, favoring, in particular, a suitable dispersion of the catalyst in the polymerization medium. The polymerization may then be carried out continuously, the catalyst being introduced into the reactor continuously or in sequence. The polymer produced may be withdrawn from the reactor also in a continuous or sequenced manner. Thus, various methods of production of polyethylene or a copolymer of ethylene and at least one other alpha-olefin in the gas phase, in the presence of these catalysts based on chromium oxide have already been described in numerous patents, such as for example British Patents nos. 810948, 1014205 and 1391771 and American Patents nos. 2936303, 3002963, 3023203 and 3300457.

In the industrial production of polyethylene or copolymers of ethylene and other alpha-olefins, it may be necessary to stop the polymerization or copolymerization reaction temporarily, in order to be able to carry out various maintenance or cleaning operations on the reactor. Bearing in mind the fact that these catalysts based on chromium oxide have a zero initial activity with a relatively long induction period when they are brought into contact with the reaction gas mixture, comprising ethylene, possibly in admixture with another alpha-olefin, the polymerization or copolymerization reaction may take some time to restart and may only actually be obtained, for example 4 to 12 hours after the contact has been made. To solve this problem, it has been proposed to add, before this contacting operation, a dialkyl-zinc compound to the polymerization medium. Unfortunately with this process the induction period is not completely eliminated, but is only reduced by approximately half, so that the polymerization or copolymerization reaction only really starts up 2 to 6 hours after the contacting of the reaction gas mixture with the catalyst.

In order to eliminate this induction period, it has also been proposed to convert the catalyst based on chromium oxide into a prepolymer obtained by contacting the said catalyst with ethylene and optionally another alpha-olefin. However, this process which makes it possible to improve very appreciably the control of polymerization during the reaction, does not make it possible to achieve an instantaneous start-up of the reaction as soon as the prepolymer is brought into contact with the reaction gas mixture. In fact, when occasional stoppages of the polymerization reaction are made to maintain or clean the reactor, impurities such as water and oxygen may be introduced into the polymerization apparatus and/or into the charge powder introduced into the reactor when the reaction is resumed. Under these conditions, and although the catalyst based on chromium oxide used in the form of a prepolymer has no induction period, the polymerization reaction does not begin immediately after the prepolymer has been brought into contact with the reaction gas mixture. The actual start-up of polymerization takes place, consequently in the presence of a relatively high concentration of catalyst in the fluidized bed, so that the speed of the polymerization reaction may increase rapidly and abruptly, involving risks of localized hot-spots and bursting of the polymer granules into fine particles.

These localized hot-spots may lead to the formation of agglomerates and to the setting of the polymer inside the reactor and are liable to involve the stoppage of the polymerization reaction. Moreover, in the special case of polymerization in a fluidized bed, the fine particles formed by the bursting of the granules making up the fluidized bed are inevitably entrained outside this bed, which gives rise to a continued polymerization reaction outside the reactor.

These undesirable phenomena, such as in particular the formation of agglomerates, are amplified in the case of the start-up of a reaction of copolymerization of ethylene with at least one other alpha-olefin, so that certain copolymerization reactions cannot start-up immediately under the conditions necessary to obtain the desired quality of copolymer.

Moreover, the considerable increase in the concentration of catalyst in the fluidized bed at the moment of start-up of the reaction appreciably modifies the conditions of development of polymerization or copolymerization, so that the polymers or copolymers produced in the initial phase of reaction have properties notably different from those of the desired products, especially as regards the density, comonomer content, melt index and content of catalytic residues. It is then observed that it is necessary to produce a relatively large quantity of polymer or copolymer before obtaining the product of the desired quality, this quantity of polymer or copolymer possibly representing, for example, for 3 to 6 times the capacity of the reactor for polymer or copolymer.

It has been found that it is possible to avoid the difficulties mentioned above and to obtain start-up of the polymerization or copolymerization reaction as soon as the ethylene, optionally in admixture with at least one other alpha-olefin has been brought into contact with the charge powder, and in the presence of the catalyst used in the form of a prepolymer, without the risk of formation of agglomerates or of fine particles, the polymers or copolymers produced during this start-up period having constant properties and immediately complying with the desired quality.

The object of the present invention is therefore a process for the polymerization of ethylene or copolymerization of ethylene and at least one other alpha-olefin in the gas phase by bringing ethylene and optionally at least one other alpha-olefin in contact under polymerization or copolymerization conditions in a reactor in which the polymer or the copolymer is maintained in a fluidized bed and/or is agitated with mechanical stirring, said reactor containing a charge powder, in the presence of a catalyst comprising a chromium oxide compound, associated with a granular support based on a refractory oxide and activated by a thermal treatment at a temperature equal to or greater than 250° C., but below the temperature at which the granular support begins to sinter under a non-reducing atmosphere, preferably an oxidizing atmosphere, the catalyst being used in the form of a prepolymer obtained by bringing the said catalyst in contact with ethylene and optionally at least one other alpha-olefin, this process comprising a start-up operation with the charge powder and being characterized in that prior to the introduction of the prepolymer into the reactor, the charge powder utilized is dehydrated and thereafter subjected to a treatment lasting at least 5 minutes by bringing the said charge powder in contact with at least one organo-aluminum compound of the formula Al $R_nX_{3-n}$ in which R is an alkyl group comprising 2 to 12 carbon atoms, X is a hydrogen atom or an alcohol group, and n is a whole number or a fraction comprised between 1 and 3, the quantity of organo-aluminum compound used being comprised between 0.1 and 50 millimoles per kilogram of charge powder.

The catalysts used according to the invention are obtainable by a large number of known processes, notably by those according to which, in a first stage, a chromium compound such as a chromium oxide generally of the formula $CrO_3$, or a chromium compound which can be converted by calcining into chromium oxide, such as for example a chromium nitrate or chromium sulphate, or an ammonium chromate, a chromium carbonate, chromium acetate or chromium acetyl acetonate or a tert-butyl chromate, is associated with a granular support based on a refractory oxide such as for example silica, alumina, zirconium oxide, thorium oxide, titanium oxide or mixtures of co-precipitate of at least two of these oxides. In a second stage, the chromium compound thus associated with the granular support is subjected to an operation known as activation by thermal treatment at a temperature of at least 250° C. and at most equal to the temperature at which the granular support begins to sinter; the temperature of the thermal treatment is generally comprised between 250° C. and 1200° C., and preferably comprised between 350° C. and 1000° C. This thermal treatment is performed under a non-reducing atmosphere, preferably under an oxidizing atmosphere, generally consisting of a gaseous mixture comprising oxygen, such as for example air. The duration of the thermal treatment may be comprised between 5 minutes and 24 hours, preferably comprised between 30 minutes and 15 hours, so that at the end of this treatment the chromium compound is at least partially in the hexavalent state. The content by weight of chromium in the catalyst thus obtained is generally comprised between 0.05% and 30%, and preferably comprise between 0.1% and 3%.

The granular supports based on a refractory oxide used in the preparation of the catalysts according to the invention generally occur in the form of solid particles which may have a mean diameter by mass comprised between 20 and 300 microns.1 These granular supports may be obtained by various known processes, notably by precipitation of silicon compounds, such as silica, from a silicate solution of an alkali metal, or else by the coprecipitation of a gel or a hydrogel of refractory oxide from solutions comprising at least two compounds chosen from amongst compounds of silicon, titanium, zirconium, thorium or aluminum. Such processes in particular are described in American Patents nos. 4053436 and 4101722.

Another method for preparing the catalyst according to the invention consists first of all in preparing a support of silica and titanium oxide by calcining a titanium compound such as titanium tetraisopropoxide deposited on the silica, at a temperature comprising between 500° C. and 900° C., under an atmosphere of dry air, then in impregnating the said support with a chromium compound, such as tert-butyl chromate, and subjecting the product obtained to the operation known as activation by thermal treatment. Such a method is described for example in American Patent no. 3879362.

One may also use a catalyst obtained in a first stage by coprecipitation of a gel or a hydrogel such as that referred to above in the presence of a chromium compound so that a cogel is formed comprising on the one hand at least one refractory oxide, such as silica or alumina, and on the other hand a chromium compound. In a second stage this cogel is dried, then subjected to the operation known as activation by thermal treatment.

Another technique for preparing the catalyst according to the invention consists in performing the operation known as activation in the presence of certain titanium compounds such as titanium tetraisopropoxide, according to a method described for example in French Patent no. 2134743.

Another preferred method of preparation of the catalysts according to the invention consists in performing the operation known as activation in the presence of fluorine compounds chosen from amongst hexafluorotitinate, tetrafluoroborate and hexafluorosilicate of ammonium, and optionally in the presence of a this method advantageously making it possible to increase the activity of these catalysts or to modify the properties of the polyolefins produced. For example, American Patent no. 3130188 describes a catalyst supported on a chromium oxide base, this catalyst being obtained in particular by the operation known as activation in the presence of a fluorine compound, such as ammonium fluorosilicate. Another method described in British Patent no. 1391771 consists in effecting the operation known as activation of the catalyst supported on a chromium oxide base in the presence of on the one hand of a titanium compound such as a titanium alcoholate, for example titanium tetraisopropoxide, and on the other hand of a fluorine compound such as hexafluorotitinate, ammonium tetrafluoroborate or ammonium hexafluorosilicate. The fluorine content in these catalysts is preferably comprised between 0.05% and 8% by weight.

According to another embodiment, the catalysts may be modified by bringing them into contact with organometallic compounds such as an alkyl-aluminum alcoholate, according to a method described, for example in French Patent no. 2269537.

According to the invention it is preferred to use catalysts comprising a chromium compound and a titanium compound to produce polymers or copolymers of ethylene having in particular a mean molecular weight which is comparatively low. The content by weight of titanium of these catalysts is generally comprised between 0.1% and 20% and preferably comprised between 0.5% and 8%.

The catalyst is used according to the process; of the invention in the form of a prepolymer obtained by bringing the said catalyst into contact with ethylene, optionally in admixture with at least one other alpha-olefin which may preferably comprise from 3 to 12 carbon atoms. As alpha-olefin in admixture with the ethylene it is preferred to use propylene, 1-butene, 1-hexene, 4-methyl-1-pentene or 1-octene. Prepolymerization may be carrier put either in suspension in a liquid hydrocarbon medium, orlin the gas phase in a reactor with a fluidized bed and/or with mechanical stirring, at a temperature below that at which the particles of prepolymer begin to soften and form agglomerates, preferably at a temperature comprised between 40° C. and 115° C.

The prepolymerization may be carried out in one or in two stages. When the prepolymerization is made in one stage the prepolymer is obtained by polymerization of ethylene or copolymerization of ethylene and at least one other alpha-olefin either in a liquid hydrocarbon medium or in the gas phase; in general this stage may be continued, whilst preserving a suitable activity in the catalyst, until the prepolymer contains from $4 \times 10^{-5}$ to 3 and preferably from $10^{-3}$ to $10^{-1}$ milligram atoms of chromium per gram, when the prepolymer is made in two stages, the first stage, referred to as a stage of coating is performed by polymerization of ethylene or copolymerization of ethylene and at least one other alpha-olefin in a liquid hydrocarbon medium. Generally this stage may be continued until the coated catalyst obtained contains from 0.1 to 10 g of polymer or copolymer per milligram atom of chromium. The second stage of prepolymerization may proceed either also in a liquid hydrocarbon medium or in the gas phase; in general this stage may be continued, whilst preserving a suitable activity in the catalyst, until the prepolymer contains from $4 \times 10^{-5}$ to 3 and preferably from $10^{-3}$ to $10^{-1}$ milligram atoms of chromium per gram.

The prepolymer advantageously occurs in the form of a powder consisting of particles having a mean diameter by mass comprised between 40 and 1000 microns, preferably comprised between 80 and 500 microns and more especially between 100 and 400 microns, which are dimensions compatible with use for polymerization in a reactor in a fluidized bed and/or with mechanical stirring.

The prepolymerization may advantageously be performed in the presence of at least one organo-metallic compound (a) of a metal Groups I to III of the Periodic Table of Elements. Organo-metallic compound (a) is preferably chosen from amongst organo-aluminum, organo-magnesium and organo-zinc compound or a mixture thereof. As organo-aluminum compound, one may select a trialkyl aluminum, a hydride or an alcoholate or alkyl aluminum. Preferably a trialkyl aluminum is used such as trithyl aluminum, or an alkyl aluminum alcoholate such as diethyl aluminum ethoxylate. The quantity of organo-metallic compound (a) used in the prepolymerization is such that the atom ratio of the quantity of metal of the said organo-metallic compound (a) to the quantity of chromium in the catalyst is comprised between 0.01 and 30, and preferably comprised between 0.1 and 1.

Experience has shown that in some cases the presence of an organo-metallic compound (a) such as an alkyl aluminum alcoholate during prepolymerization makes it possible to reduce appreciably the formation of waxes, which are products consisting essentially of polymer or copolymer soluble in n-hexane at 60° C. and which tend to render the particles of prepolymer sticky and to decrease their polymerization activity. Thus it is especially advantageous to prepare prepolymers having a content of polymer or copolymers soluble in n-hexane at 60° C. less than or equal to 2.0% by weight.

The prepolymerization may also be performed in the presence of hydrogen to control the molecular weight of the prepolymer produced, especially if the latter is obtained in the presence of organo-metallic compound (a).

The prepolymer is obtained in the form of a dry powder consisting of particles active in polymerization, after separation from the liquid hydrocarbon medium in which it may have been prepared. The prepolymer may then be brought into contact directly with the powder and the reaction gas mixture, as a solid with an initial catalytic activity which is not zero.

However, it is preferable to subject the prepolymer, before it is brought into contact with the charge powder and the reaction gas mixture, to one or more extraction operations by means of a liquid hydrocarbon such as n-hexane, and finally to obtain the prepolymer in the form of a powder, after evaporating this liquid hydrocarbon. These extraction operations make it possible to eliminate waxes which may form during prepolymerization and which consist essential of polymer or copolymer soluble in n-hexane at 60° C. These waxes are particularly troublesome during the drying of the prepolymers, since they tend to stick the particles of prepolymer together and form agglomerates. These waxes may thus be effectively eliminated from the prepolymer particles which may have a content of polymer or copolymer soluble in n-hexane at 60° C. of less than or equal to 2.0% by weight. Furthermore the extraction operations make it possible to create porosity inside the prepolymer particles and in particular they favor the accessibility of the ethylene and other alpha-olefins to catalytic sites, this porosity also makes it possible to impregnate the prepolymer more effectively with liquid compounds such as organo-metallic compounds, and in this way better to protect the active sites against possible poison.

The charge powder used for starting up the polymerization or copolymerization consists of solid particles or an inorganic product such as silica, alumina, talc or magnesia or else an organic product such as a polymer or copolymer. The charge powder may in particular be a polyolefin powder and more especially a powder of polyethylene or a copolymer of ethylene and at least one other alpha-olefin. Preferably it may be the same as the powder of polyethylene or copolymer of ethylene and at least one other alpha-olefin which is to be produced, so that as soon as the reaction starts up one immediately obtains the polymer or copolymer of the quality desired. Such a charge powder may in particular originate from a previous polymerization or copolymerization reaction. Thus, as charge powder, a high-density polyethylene powder may be used (density over 0.940) or a powder or a copolymer of ethylene with less than 20% by weight of at least one other alpha-olefin which may comprise for example from 3 to 12 carbon atoms.

Advantageously the powder consists of particles having a mean diameter by mass comprised between 50 and 5000 microns, and preferably comprised between 200 and 3000 microns. The size of the size of the particles of polymer or copolymer to be produced, partly as a function of the type of polymerization reactor and the conditions of use of this reactor, such as the rate of fluidization which may be comprised for example between 2 and 10 times the minimum rate of fluidization of the particles of polymer or copolymer to be produced.

Although it was known that charge powders could be heated with organo aluminum compounds, prior to polymerization, in order to react with the water contained in the charge powder, it has surprisingly been found that by dehydrating the charge powder, prior to the treatment with the organo aluminum compound or compounds the formation of agglomerates may be avoided. The dehydration is performed under conditions such that when the charge powder is brought into contact with an atmosphere of gas, for example an inert gas, hydrogen, ethylene optionally in admixture with at least one other alpha-olefin or a mixture of two or more of these gases, the water content of this atmosphere after dehydration, is equal to or less than 15 vpm, and preferably equal to or less than 6 vpm. Surprisingly it has been noted, in fact, that when the water content of such an atmosphere brought into contact with the charge powder is over 15 vpm, the particles of the charge powder tend to agglomerate together during the treatment of the latter with the organo-aluminum compound, which represents a phenomenon detrimental to the start-up of polymerizations or copolymerizations in a fluidized bed and/or with mechanical stirring. The dehydration of the charge powder may be performed by subjecting it to one or more purge operations by means of inert gas, hydrogen, ethylene possibly in admixture with at least one other alpha-olefin or a mixture of two or more of these gases, having the lowest possible content of products considered as catalyst poisons, such as water. Thus for example if during these purge operations an inert gas such as nitrogen is used, its water content may be lower than 0.8 vpm and preferably lower than 0.3 vpm.

These purge operations are carried out according to techniques in themselves known, such as continuous scavenging of the charge powder or successive operations of pressurizing and degassing the charge powder by means of gas or the gas mixture referred to above. They may be carried out under a pressure at least equal to atmospheric pressure, preferably under a pressure comprised between 0.1 and 5 MPa, at a temperature equal to or greater than 0° C., but below the temperature at which the particles of charge powder begin to soften and form agglomerates, and preferably at a temperature comprised between 40° C. and 120° C.

The treatment of the charge powder, consisting in bringing it into contact with the organo-aluminum compound, may take place in a fluidized bed and/or with mechanical stirring in the presence of an inert gas, hydrogen, ethylene possibly in admixture with at least one other alpha-olefin or a mixture of two or more of these gases. The treatment may in particular be performed in the presence of the reaction gas mixture used during the polymerization or the copolymerization.

As inert gas one uses a gas which is inactive in respect of the catalyst and the reagents used in the polymerization or copolymerization medium. It may be chosen from among nitrogen, argon, zenon, helium, methane, ethane, propane or butane. As alpha-olefin in admixture with the ethylene, one may use in particular the alpha-olefins which may comprise from 3 to 12 carbon atoms, such as for example propylene, 1-butene. 1-hexene, 4-methyl-1-pentene or 1-octene.

The treatment of the charge powder may be performed under a pressure at least equal to atmospheric pressure, and preferably under a pressure comprised between 0.1 and 5 MPa, at a temperature comprised between 0° C. and 120° C. and preferably at a temperature equal to or greater than 40° C., but below the temperature at which the particles of the charge powder begin to soften and form agglomerates.

The organo-aluminum compound used in the process according to the invention may be chosen from amongst the trialkyl aluminums, hydrides or alkyl-aluminum alcoholates. Generally it is preferred to use a trialkyl aluminum, such as triethyl aluminum, triisobutyl aluminum, tri-n-hexyl aluminum or tri-n-octyl aluminum, or else an alkyl aluminum alcoholate, such as diethyl aluminum ethoxylate. In certain cases, especially with a view to simplifying the process of the invention, the organo-aluminum compound may advantageously be the same as that used as the organo-metallic compound (a) for obtaining the prepolymer.

The organo-aluminum compound used in the treatment of the charge powder may be employed as it is, or preferably in the form of a solution in a saturated aliphatic hydrocarbon which may comprise from 4 to 6 carbon atoms, in order to facilitate its dispersion in the charge powder.

The quantity of organo-aluminum compound used in the treatment of the charge powder is comprised between 0.1 and 50 millimoles and preferably between 1 and 20 millimoles per kilogram of charge powder. It has been observed, in fact, that the use of a quantity of organo-aluminum compound of less than 0.1 millimoles per kilogram of charge powder does not enable the instantaneous start-up of the polymerization or copolymerization reaction to be achieved as soon as it is brought into contact with ethylene and optionally at least one other alpha-olefin with the charge powder in the presence of the prepolymer, and leads after the start-up of this reaction to production of polymer or copolymer of a quality not desired at the time. The use of a quantity of organo-aluminum compound of over 50 millimoles per kilogram of charge powder, on the other hand, causes an instantaneous start-up of the reaction as soon as the ethylene and optionally at least one other alpha-olefin are brought into contact with the charge powder in the presence of the prepolymer, but generally with an activity which is too high, so that localized hot-spots may be produced in the fluidized bed, involving the formation of agglomerates.

The duration of the treatment of the charge powder should be at least 5 minutes and preferably over 15 minutes. It has been observed, in fact, that when the duration of the treatment is less than 5 minutes, the polymerization or copolymerization reaction does not start-up instantaneously as soon as the ethylene and optionally at least one other alpha-olefin have been brought into contact with the charge powder in the presence of the prepolymer.

Bringing the ethylene and optionally at least one other alpha-olefin in contact with the charge powder in the presence of the prepolymer may be performed in a manner in itself known, by means of a polymerization or copolymerization reactor with a fluidized bed and/or with mechanical stirring. The charge powder is introduced into the reactor which is fed, with a reaction gas mixture consisting of ethylene, optionally is admixture with at least one other alpha-olefin, with hydrogen and/or one or more inert gases, under polymerization or copolymerization reaction conditions in the gas phase, that is to say under a pressure generally comprised between 0.1 and 5 MPa, preferably comprised between 0.5 and 4 MPa, and at a temperature generally comprised between 0° C. and 115° C., preferably comprised between 40° C. and 110° C.

Surprisingly it has been found that when one desires to attain in an advantageous manner in a relatively short time a stable production rate of polyethylene or copolymer of ethylene and at least one other alpha-olefin of the desired quality, it is possible thanks to the process of the invention to perform the initial stage of the polymerization or copolymerization in the presence of prepolymer in a relatively large quantity, without forming agglomerates or fine particles. In particular it becomes possible prepolymer up to 10 times greater than the minimum quantity necessary to obtain the polymerization or copolymerization desired as a stable production system for a period corresponding to the production of a quantity by weight of polyethylene or a copolymer of ethylene and at least one other alpha-olefin comprised between 1 and 6 times the quantity of charge powder employed.

Bringing the ethylene and optionally at least one other alpha-olefin in contact with the charge powder may also be performed in the presence of an organo-metallic compound (b) of a metal of Groups I to III of the Periodic Table of Elements, in a quantity comprised between 0.01 and 10 millimoles and preferably comprised between 0.1 and 5 millimoles per kilogram of polyethylene or copolymer of ethylene and at least one other alpha-olefin produced. The organo-metallic compound (b) may be of a nature identical to or different from the organo-metallic compound (a) used in obtaining the prepolymer.

The presence of the organo-metallic composed (b) during polymerization or copolymerization in the gas phase makes it possible to increase advantageously the reaction yield. In particular it permits the destroying of the poisons present in the reaction medium and also of improving control of the mean molecular weight, and also the molecular weight distribution of the polymer or copolymer produced. It may be carried out to advantage when the weight of polymer or copolymer is equal to or greater than 0.1 times and preferably equal to or greater than 0.3 times the weight of the charge powder employed.

According to the process of the invention, it is possible to achieve the start-up of the reaction of polymerization of ethylene or copolymerization of ethylene and at least one other alpha-olefin comprising from 3 to 12 carbon atoms, in a fluidized bed and/or with mechanical stirring under very advantageous and very simple conditions, making it possible in particular, as soon as polymerization or copolymerization commences, to obtain polymers or copolymers of desired quality, under excellent conditions of yield and productivity of the industrial plant. By means of the process of the invention, it is easy to carry out the start-up, for example, of production of high density polyethylenes (density greater than or equal to 0.940), amongst which are homopolymers of ethylene and copolymers of ethylene and another alpha olefin comprising preferably from 3 to 12 carbon atoms, having a content by weight of units derived from ethylene of greater than or equal to approximately 98%, or linear low density polyethylenes (density comprised between 0.890 and 0.940), consisting of a copolymer of ethylene and one or more alpha-olefins, preferably comprising from 3 to 12 carbon atoms, having a content by weight of units derived from ethylene comprised between approximately 80% and 98%.

The following non-restrictive Examples illustrate the present invention.

EXAMPLE 1

Preparation of the Catalyst

For 5 hours, in a fluidized bed reactor, using a current of dry air, a catalyst powder sold by Joseph Crossfield & Sons (Warrington, Great Britain) under the trade name "EP 20" ® is subjected to a thermal treatment at 815° C. This catalyst, consisting of chromium oxide of the formula $CrO_3$, associated with a silica support, contains 1% by weight of chromium. After treatment and cooling to ambient temperature (20° C.), the catalyst (A) occurs in the form of a powder consisting of particles having a diameter by mass of 125 microns. It is maintained under an atmosphere of nitrogen during storage.

Preparation of the Prepolymer

Into a 1000 liter stainless steel reactor, equipped with a stirring system, rotating at 140 revolutions per minute, there are introduced under an atmosphere of nitrogen 500 liters of n-hexane heated to 75° C., then 264 millimoles of diethyl aluminum ethoxylate and 5.5 kg of the catalyst (A) prepared as described above. Ethylene is then introduced at a throughput of 15 kg/h for 4 hours. At the end of this period, the suspension of prepolymer thus obtained is maintained at a temperature of 75° C. for 30 minutes in order to consume to the maximum extent the ethylene which has not reacted. The reactor is then degassed, then cooled to 60° C.

300 liters of n-hexane, previously heated to 60° C., are added to the prepolymer suspension which is maintained under these conditions with stirring for 15 minutes, before extracting; from this suspension approximately 300 liters of liquid phase. This operation is temperature (20° C.) and 2120 millimoles of triethyl aluminum are added to it. After drying under nitrogen, approximately 60 kg of prepolymer (B) are obtained in the form of a powder consisting of particles having a mean diameter by mass of 190 microns and containing $1.6 \times 10^{-2}$ milligram atoms of chromium per gram and less than 2.0% by weight of polymers soluble iu n-hexane at 60° C.

Start-up of Polymerization in a Fluidized Bed

A reactor of the fluidized bed type, in stainless steel, with a diameter of 45 cm, maintained beforehand under an atmosphere of nitrogen, is subjected to purging by means of nitrogen at 90° C., having a water content of less than 0.3 vpm, this purge consisting in successive operations of pressurizing the reactor at 1.8 MPa and degassing it at atmospheric pressure, these operations are repeated four times. Thereafter, a continuous stream of nitrogen at 90° C. is passed into the reactor until the water content of the nitrogen stream at the outlet of the reactor is reduced to 10 vpm. There are then introduced into the reactor as charge powder 70 kg of a polyethylene powder having a bulk density of 0.4 g/cm³, a density (at 20° C.) of.0.950, a chromium content of 2 ppm, a melt index ($MI_{21.6}$) measured at 190° C. under a charge of 21.6 kg equal to 2 g/10 minutes and vinyl vinylidene and vinylene-type unsaturation levels equal to 0.111, 0.013 and 0.005 respectively per 100 carbon atoms. This powder consists of solid particles having a mean diameter by mass of 900 microns.

The reactor containing the polyethylene powder is then subjected to dehydration with nitrogen at 90° C., until the water content of the atmosphere in the reactor is reduced to a value of 3 vpm. There is then introduced into the reactor a reaction gas mixture consisting of ethylene and nitrogen, propelled at a rising speed of 82 cm/s at a temperature of 96° C. The partial pressures (pp) of the two constituents of this gas mixture are as follows:

pp ethylene = 1.05 MPa
pp nitrogen = 0.95 MPa there is then introduced into the reactor 1.0 liter 9f a molar solution of tri-n-octyl aluminum (TnOA) in n-hexane, and the reactor is maintained under these conditions for 1 hour. 4 g of the prepolymer (B) prepared as described above are introduced into this reactor every 5 minutes.

At the end of approximately 3 hours from commencement of the introduction of prepolymer, there are introduced continuously into the reactor 10 ml/h of the molar solution of TnOA in n-hexane.

It is found that the polymerization reaction starts up as soon as prepolymer is introduced into the reactor, and that for the first 24 hours of the reaction the chromium content in the polyethylene present in the fluidized bed never exceeds 2 ppm, and becomes gradually less than this figure. Moreover, the melt index ($MI_{21.6}$) and the density of the polyethylene making up the fluidized bed remain substantially constant and equal to 2 g/10 minutes and 0.950 respectively. No formation of agglomerate of polyethylene is observed in the reactor during the start up of this reaction.

EXAMPLE 2

Start-up of Polymerization in a Fluidized Bed:

One operates exactly as in Example 1, except for the fact that instead of using a fluidized bed reactor which has been previously purged by an atmosphere of nitrogen, one uses a reactor previously maintained under an atmosphere of ambient air, and instead of introducing into the reactor 1.0 liter of a molar solution of TnOA in n-hexane, 1.5 liters of this solution are introduced.

The start-up of the polymerization reaction otherwise proceeds identically to that of the reaction described in Example 1. In particular, one immediately obtains the desired quality of ethylene, this quality being substantially identical to :hat of the charge powder initially introduced into the reactor. No formation of agglomerate of polyethylene in the reactor is observed throughout the entire period of start-up of the reaction.

EXAMPLE 3 (COMPARATIVE)

Start-up of Polymerization in a Fluidized Bed

One operates exactly as in Example 1, except for the fact that the operations of start-up of the polymerization do not comprise any introduction of TnOA into the reactor containing the charge powder.

It is found that the polymerization reaction does not start-up as soon as prepolymer is introduced into the reactor, and that the chromium content of the polyethylene making up the fluidized bed exceeds 2 ppm and increases up to approximately 30 ppm during the first hours of introduction of prepolymer into the reactor. It is also found that other properties of the polyethylene powder making up the fluidized bed develop, such as the density and melt index, during the start-up of this reaction. The formation of agglomerates of polyethylene is observed in the reactor at the end of approximately 20 hours of introduction of prepolymer into the reactor.

EXAMPLE 4

Preparation of the Catalyst

A catalyst comprising 1% by weight of chromium in the form of chromium oxide of the formula $CrO_3$ and 2% by weight of titanium in the form of titanium oxide of the formula $TiO_2$, associated with a granular support of silica having a high pore volume (over 1.8 ml/g) is obtained after a thermal treatment at 850° C. for 5 hours in a fluidized bed reactor, by means of a current of dry air. The catalyst obtained (C) is cooled to ambient temperature (20° C.) and occurs in the form of a powder consisting of particles having a mean diameter by mass of 150 microns. It is maintained under an atmosphere of nitrogen whilst being stored.

Preparation of the Prepolymer

One operates exactly as in example 1, except for the fact that instead of using catalyst (A) catalyst (C) is employed. In this way approximately 60 kg of prepolymer (D) are obtained having a mean diameter by mass of 250 microns and containing $1.7 \times 10^{-2}$ milligram atoms of chromium per gram and less than 2.0% by weight of polymers soluble in n-hexane at 60° C.

Start-up of Polymerization in a Fluidized Bed

A fluidized bed type reactor, in stainless steel, with a diameter of 45 cm, maintained beforehand under an atmosphere of nitrogen, is subjected to purging by nitrogen st 90° C., having a water content of less than 0.3 vpm, this purge consisting in successive operations of pressurizing the reactor at 1.8 MPa and degassing it to atmospheric pressure, these operations being carried out four times. Thereafter a continuous stream of nitrogen at 90° C. is passed into reactor, until the water content of the nitrogen stream at the outlet of the reactor is reduced to 10 vpm. There are then introduced into the reactor as charge powder 70 kg of a polyethylene powder having a bulk density of 0.4 g/cm$^3$, a density (at 20° C.) of 0.953, a chromium content of 2 pps, a melt index (MI$_{8.5}$) measured at 190° C. under a charge of 8.5 kg equal to 1.5 g/10 minutes and vinyl, vinylidene and vinylene type unsaturation levels equal to 0.113, 0.014 and 0.006 respectively per 100 carbon atoms. This powder consists of solid particles having a mean diameter by mass of 1500 microns.

The reactor containing the polyethylene powder is then subjected to dehydration by nitrogen at 90° C., until the water content of the atmosphere in the reactor is reduced to a value of 3 vpm. There is then introduced into the reactor a reaction gas mixture consisting of hydrogen, ethylene and nitrogen, propelled at a rising speed of 82 cm/s, at a temperature of 98° C. The partial pressures (pp) of the three constituents of this gas mixture are as follows:
 pp hydrogen = 0.36 MPa
 pp ethylene = 1.05 MPa
 pp nitrogen = 0.593 MPa
There is then introduced into the reactor 1.0 liters of a molar solution of tri-n-octyl aluminum (TnOA) in n-hexane and the reactor is thus maintained under these conditions for 1 hour. 4 g of prepolymer (D) prepared previously are then introduced into this reactor every 5 minutes.

At the end of approximately 3 hours after commencement of the introduction of the prepolymer, there are introduced continuously into the reactor 10 ml/h of molar solution of TnOA in n-hexane.

It is found that the polymerization reaction starts up as soon as the prepolymer is introduced into the reactor and that during the first 24 hours of reaction, the chromium content of the polyethylene never exceeds 2 ppm and becomes gradually less than this figure. Moreover, the melt index (MI$_{8.5}$) and the density of the polyethylene present in the fluidized bed remain substantially constant and equal to 1.5 g/10 minutes and 0.953 respectively. No formation of agglomerate of polyethylene is observed in the reactor during the start up of this reaction.

EXAMPLE 5

Start-up of Copolymerization in a Fluidized Bed

A fluidized bed type reactor, in stainless steel, with a diameter of 45 cm, maintained beforehand under an atmosphere of nitrogen, is subjected to purging by nitrogen at 90° C. with a water content of less than 0.3 vpm, this purge consisting in successive operations of pressurizing the reactor at 1.8 MPa and degassing to atmospheric pressure, these operations being performed four times. Thereafter, a continuous stream of nitrogen at 90° C. is passed into the reactor until the water content of the nitrogen stream at the outlet of the reactor is reduced to 10 vpm. There are then introduced into the reactor as charge powder 70 kg of a powder of a copolymer of ethylene and 1-butene having a bulk density of 0.4 g/cm$^3$, a density (at 20° C.) of 0.919, a chromium content of 2 ppm, a content by weight of units derived from 1-butene of 8% and a melt index (MI$_{2.16}$) measured at 190° C. under a charge of 2.16 kg equal to 4.4 g/10 minutes. This powder consists of solid particles having a mean diameter by mass of 1600 microns.

The reactor containing the polyethylene powder is then subjected to dehydration with nitrogen at 80° C., until the water content of the atmosphere in the reactor is reduced to a value of 3 vpm. There is then introduced into the reactor a reaction gas mixture consisting of hydrogen, ethylene, 1-butene and nitrogen, propelled at a rising speed of 82 cm/s, at a temperature of 75° C. The partial pressures (pp) of the four constituents of this gas mixture are as follows:
 pp hydrogen = 0.15 MPa
 pp ethylene = 1.20 MPa
 pp 1-butene = 0.15 MPa
 pp nitrogen = 0.50 MPa
There is then introduced into the reactor 1.0 liter of a molar solution of tri-n-octyl aluminum (TnOA) in n-hexane and the reactor is maintained under these conditions for 1 hour. 4 g of the prepolymer (D) prepared in Example 4 are injected into this reactor every 5 minutes.

At the end of approximately 4 hours after commencement of introduction of the prepolymer, there are continuously introduced into the reactor 10 ml/h of the molar solution of TnOA in n-hexane.

It is found that the copolymerization reaction starts up as soon as the prepolymer is introduced into the reactor, and that during the first 24 hours of the reaction the chromium content of the copolymer making up the fluidized bed never exceeds 2 ppm, and gradually becomes less than this figure. Moreover, the melt index, density and content by weight of units derived from butene-1 of the copolymer making up the fluidized bed remain substantially constant, equal to 4.4 g/10 minutes, 0.919 and 8% respectively. No formation of agglomerate of the copolymer in the reactor is observed during the start-up of this reaction.

EXAMPLE 6 (COMPARATIVE)

Start up of Copolymerization in a Fluidized Bed

One operates exactly as in Example 5, except for the fact that instead of reducing the water content of the atmosphere in the reactor before and after introducing the charge powder, to 10 and 3 vpm respectively, it is reduced only to 25 and 20 vpm respectively.

It is found that the copolymerization reaction does not start up immediately after introducing the prepolymer into the reactor, and that the properties of the copolymer making up the fluidized bed developed very noticeably during the start-up period of the reaction, so that the copolymer produced after start up of the reaction is not in accordance with the desired quality. Furthermore, agglomerates of copolymer form very rapidly in the reactor, necessitating stopping the copolymerization reaction.

We claim:

1. Process for polymerization of ethylene or copolymerization of ethylene and at least one other alpha olefin in the gas phase by bringing ethylene and optionally at least one other alpha olefin in contact, under polymerization or copolymerization conditions in a reactor in which the polymer or the copolymer is maintained in a fluidized bed and/or is agitated with mechanical stirring, in the presence of a catalyst comprising a chromium oxide compound, associated with a granular support based on a refractory oxide and activated by thermal treatment at a temperature equal to or greater than 250° C., but below the temperature at which the granular support begins to sinter, under a non-reducing atmosphere, this process comprising a start-up operation with a charge powder and being characterized in that:

(1) a charge powder consisting of solid particles of polyethylene or copolymer of ethylene and at least one other alpha-olefin contained in the fluidized bed and/or mechanically stirred reactor, is dehydrated by subjecting it to one or more purge operations by means of an atmosphere of one or more of a gas selected from the group consisting of inert gas, hydrogen, ethylene, a mixture of ethylene with at least one other alpha-olefin, in such conditions that after dehydration the water content of this atmosphere is equal to or less than 15 vpm, (2) the charge powder is thereafter subjected to a treatment lasting at least 5 minutes by contacting the said charge powder with at least an organoaluminum compound of the formula $AlR_nX_{3-n}$ in which R is an alkyl group comprising from 2 to 12 atoms, X is a hydrogen atom or an alcoholate group and n is a whole number or a fraction comprised between 1 and 3, the quantity of organo aluminum compound used being comprised between 0.1 and 50 millimoles per kilogram of charge powder, and (3) the catalyst is thereafter introduced into the said reactor, under polymerization or copolymerization reaction conditions in the gas phase, the said catalyst being in the form of a prepolymer containing between $4 \times 10^{-5}$ and 3 milligram atoms of chromium per gram, this prepolymer being previously obtained by contracting the said catalyst with ethylene or a mixture of ethylene with at least one other alpha-olefin, in the presence of at least one organometallic compound (a) of a metal from Groups I to III of the Periodic Table of Elements in a quantity such that the atomic ratio of the quantity of metal of the said organometallic compound (a) to the quantity of chromium of the catalyst is comprised between 0.01 and 30.

2. A process according to claim 1, characterized in that the treatment of the charge powder with the organo-aluminum compound or compounds is carried out under an atmosphere consisting of inert gas, hydrogen, ethylene, a mixture of ethylene, with at least one other alpha olefin or a mixture of two or more of these gases, under a pressure at least equal to atmospheric pressure and at a temperature comprised between 0° C. and 120° C.

3. A process according to claim 2, wherein the treatment of the charge powder with the organo-aluminum compound or compounds is carried out under a pressure comprised between 0.1 and 5 MPa.

4. A process according to claim 1 characterized in that the charge powder consists of particles having a main diameter by mass comprised between 50 and 5000 microns.

5. A process according to claim 1 characterized in that the organo-aluminum compound is diethylaluminum ethoxylate or trialkylaluminum chosen from amongst triethylaluminum, triisobutyl aluminum, tri-n-hexyl aluminum or tri-n-octyl aluminum.

6. A process according to claim 1, characterized in that the initial stage of the polymerization or copolymerization of the ethylene and optionally at least one other alpha olefin is performed in the presence of a quantity of prepolymer up to 10 times the minimum quantity necessary to obtain the desired polymerization or copolymerization in a stable production system, for a period of time corresponding to the production of a quantity by weight of polyethylene or copolymer or ethylene and at least one other alpha olefin comprised between 1 and 6 times the quantity by weight of charge powder used.

7. A process according to claim 1, characterized in that the contacting of the ethylene and optionally at least one other alpha olefin with the charge powder and with the prepolymer is carried out in the presence of an organo-metallic compound (b) of a metal of Groups I or III of the Periodic Table of Elements in a quantity comprised between 0.1 1 and 10 millimoles per kilogram of polyethylene or copolymer of ethylene and at least one other alpha olefin produced, when the weight of polymer or copolymer produced is equal to or greater than 0.1 times the weight of the charge powder used.

8. A process according to claim 7, wherein the weight of polymer or copolymer produced is equal to or greater than 0.3 times the weight of the charge powder used.

9. A process according to claim 1, wherein the non-reducing atmosphere is an oxidizing atmosphere.

10. A process according to claim 1, wherein after dehydration the water content of this atmosphere is equal to or less than 6 ypm.

11. A process according to claim 1, characterized in that the prepolymer contains from $10^{-3}$ to $10^{-1}$ milligram atoms of chromium per gram.

12. A process according to claim 1, characterized in that the atomic ratio of the quantity of metal in the organo-metallic compound (a) to the quantity of chromium in the catalyst is compiled between 0.1 and 1.

* * * * *

UNITED STATES PATENT AND TRADEMARK OFFICE
CERTIFICATE OF CORRECTION

PATENT NO. : 5,075,395

DATED : December 24, 1991

INVENTOR(S) : DANIEL C. DURAND et al

Page 1 of 3

It is certified that error appears in the above-identified patent and that said Letters Patent is hereby corrected as shown below:

Col. 4, 1. 18, delete the colon after the word "thorium"

Col. 4, 1. 68, insert a comma (,) after the word "compound"

Col. 5, 1. 17, after "a" and before "this" insert --titanium compound chosen from amongst the alcoholates of titanium,---.

Col. 5, 1. 49, delete the semicolon after the word "process".

Col. 5, 1. 57, change "carrier put" to --carried out--.

Col. 5, 1. 58, change "orlin" to --or in--.

Col. 7, 1. 46, strike "of the size"

Col. 7, 1. 46, after "particles" and before "of" insert --in the charge powder is chosen partly as a function of the size of the particles---.

Col. 8, 1. 47, insert a comma (,) after "1-butene,".

Col. 9, 1. 64, after "possible" insert --to achieve this contacting in the presence of a quantity of--.

Col. 11, 1. 18, delete the semicolon after the word "extracting"

Col. 11, 1. 19, after "operation is" insert --repeated twice, then the propolymer suspension is cooled to ambient--.

Col. 11, 1. 26, should read "soluble in"

Col. 11, 1. 43, there should be a space after "of." and before "0.950".

Col. 11, 1. 61, after "liter" correct spelling of the word "of".

UNITED STATES PATENT AND TRADEMARK OFFICE
CERTIFICATE OF CORRECTION

PATENT NO. : 5,075,395
DATED : December 24, 1991
INVENTOR(S) : DANIEL C. DURAND et al It is certified that error appears in the above-identified patent and that said Letters Patent is hereby corrected as shown below:

Col. 12, l. 16, delete the colon after the word "Bed"

Col. 12, l. 29, after "to" correct the spelling of the word "that"

Col. 13, l. 26, change "pps" to --ppm--.

Col. 13, l. 48, after "in", change "n" to "n-".

Col. 15, l. 4, should read "start-up".

Col. 15, l. 54, after "obtained by" change "contracting" to --contacting--, and after "the said" insert --chromium oxide on refractory support--.

Claim 4, l. 3, change "main" to --mean--.

Claim 5, l. 1, insert a comma (,) after the number "1".

UNITED STATES PATENT AND TRADEMARK OFFICE
CERTIFICATE OF CORRECTION

PATENT NO. : 5,075,395

DATED : December 24, 1991

INVENTOR(S) : DANIEL C. DURAND, ET AL

It is certified that error appears in the above-identified patent and that said Letters Patent is hereby corrected as shown below:

Claim 7, l. 7, after "between" and before "millinoles," should read "0.1 and 10".

Claim 11, l. 3, change "ypm" to --vpm--.

Signed and Sealed this

Twenty-seventh Day of April, 1993

Attest:

MICHAEL K. KIRK

Attesting Officer  Acting Commissioner of Patents and Trademarks